United States Patent [19]
Gaeth et al.

[11] 3,760,047
[45] Sept. 18, 1973

[54] PROCESS FOR THE MANUFACTURE OF POLYMER FOAMS CONTAINING ESTERS OF TERTIARY ALCOHOLS AS SIDE GROUPS

[75] Inventors: Rudolf Gaeth, Limburgerhof; Bernhard Schmitt, Kirchzarten; Dieter Blum, Limburgerhof, all of Germany

[73] Assignee: Badische Anilin- & Soda-Fabrik Aktiengesellschaft, Ludwigshafen, Germany

[22] Filed: Dec. 4, 1970

[21] Appl. No.: 95,379

[30] Foreign Application Priority Data
Dec. 30, 1969 Germany............... P 19 65 588.0

[52] U.S. Cl.............. 264/54, 260/2.5 R, 260/2.5 D, 260/2.5 N, 264/140
[51] Int. Cl. ................... B29d 27/08, C08f 3/50
[58] Field of Search ............... 260/2.5 D, 2.5 R, 260/2.5 N; 264/54, 140; 252/307

[56] References Cited
UNITED STATES PATENTS

| | | | |
|---|---|---|---|
| 3,224,983 | 12/1965 | D'Alelio | 260/2.5 D |
| 3,225,063 | 12/1965 | D'Alelio | 260/2.5 D |
| 3,044,970 | 7/1962 | Baumeister | 260/2.5 D |
| 3,222,302 | 12/1965 | Böllert | 260/2.5 D |

FOREIGN PATENTS OR APPLICATIONS
1,109,883   6/1961   Germany

*Primary Examiner*—Philip E. Anderson
*Attorney*—Johnston, Root, O'Keeffe, Keil, Thompson & Shurtleff

[57] ABSTRACT

A process for the manufacture of foams by heating polymers containing polymerized units of esters of ethylenically unsaturated polymerizable acids having three or four carbon atoms with tert-butanol at elevated temperatures wherein a pH of from 2.0 to 0.1 is set up in aqueous systems of the polymers, the water is evaporated and the residue is heated to temperatures above the decomposition temperature of the carboxylic esters.

7 Claims, No Drawings

PROCESS FOR THE MANUFACTURE OF POLYMER FOAMS CONTAINING ESTERS OF TERTIARY ALCOHOLS AS SIDE GROUPS

This invention relates to a process for the manufacture of foams from polymers containing esters of tertiary alcohols as side groups.

German Pat. No. 1,109,883 discloses a method of foaming polymers of tert-butyl acrylates or methacrylates by heating the polymers at temperatures above their softening range to cause elimination of isobutylene and consequent expansion of the polymers. This process is not satisfactory in all respects since the elimination of the isobutylene takes place at relatively high temperatures and only coarse-celled foams are obtained.

It is an object of the invention to provide a process for the production of foams containing ester groups of tertiary alcohols at relatively low temperatures.

It is another object of the invention to provide foams having particularly fine cells.

These objects of the invention are achieved by setting up a pH of from 2.0 to 0.1 in aqueous systems of polymers containing a polymerized units of esters of unsaturated polymerizable acids with tert-butyl alcohol, evaporating the water and heating the residue at temperatures above the decomposition temperature of the carboxylic esters.

Whereas the polymers used according to the process of German Pat. No. 1,109,883 do not eliminate isobutylene until a relatively high temperature is reached, for example from 150° to 160°C, the polymers used in the process according to the present invention eliminate olefins at much lower temperatures. The foams produced by the present process are distinguished by a particularly fine cellular structure.

Suitable esters of tert-butanol are those of ethylenically unsaturated copolymerizable carboxylic acids containing three or four carbon atoms, such as acrylic, methacrylic and maleic acids.

Suitable comonomers which may be optionally copolymerized with the said unsaturated esters of tertiary alcohols to form the polymer in question are copolymerizable ethylenically unsaturated compounds such as acrylic or methacrylic esters of alcohols having from one to nine carbon atoms, vinyl esters, vinyl chloride, vinylidene chloride, styrene and butadiene.

Particularly advantageous polymers for the process of the invention are those which contain, in addition to the carboxylic esters of tertiary alcohols, polymerized units of copolymerizable acids. Suitable acids are for example acrylic, methacrylic and maleic acids. Copolymerizable acids having a dissociation constant of more than $10^{-4}$ are preferred.

Of the copolymerizable acids having a dissociation constant of more than $10^{-4}$ vinyl sulfonic acid is preferred. Examples of other acids which may be used are styrene sulfonic acid, 3-methacryloxy-(propyl or ethyl)-sulfonic acid, 3-acryloxy-(propyl or ethyl)-sulfonic acid and vinyl phosphonic acid. The content of such polymerized acid units in the copolymer is from 0.1 to 10 percent, preferably from 0.5 to 6 percent, by weight based on the total weight of monomers.

It should moreover be emphasized that the incorporation by polymerization of monomers having a strongly polar group, such as acrylonitrile or methacrylonitrile, in amounts of from 0.1 to 40 percent, preferably from 0.5 to 20 percent, by weight is advantageous.

The polymers to be used in the process of the invention should have a K value according to Fikentscher of more than 25.

The polymers may be prepared by suspension polymerization or, particularly readily, by emulsion polymerization. The dispersions thus obtained may either be dried and foamed in a single operation or they may be dried under mild conditions or coagulated and subsequently foamed in a separate operation.

The polymers are processed in an aqueous system. By an aqueous system we mean a solution or, preferably, a dispersion. The disperse particles generally have a particle diameter of from 0.15 to 0.4 mm.

According to the process of the invention, the aqueous system of the polymers are advantageously first heated at a temperature below the decomposition temperature of the polymers containing the tertiary ester groups, i.e., below the temperature at which the olefins are eliminated, to evaporate the water. The resultant dried polymers, which have a residual water content of not more than 10 percent, preferably of less than 3 percent, particularly of less than 1 percent, are then heated at temperatures above the decomposition temperature of the polymers to cause decomposition thereof. This operation may be carried out at atmospheric, subatmospheric or superatmospheric pressure, for example in a press. In the latter case the surface of the foam is smooth or grained depending on surface of the inside walls of the mold. If foaming is carried out at atmospheric pressure, the surface of the foamed material is somewhat uneven. At subatmospheric pressure, the foaming gases liberated during foaming are removed particularly rapidly.

By decomposition temperature of the carboxylic esters we mean the temperature at which the polymerized units of carboxylic esters dissociate into carboxylic acids and olefins. The decomposition temperature depends on a number of factors, such as the type of carboxylic ester used and its concentration in the polymer. The decomposition temperature must be determined from case to case.

The decomposition of polymers containing tertiary ester groups, when effected in aqueous systems, is also dependent on the pH. The aqueous systems containing the polymers must therefore be adjusted to a pH of from 2.0 to 0.1 before they are dried and decomposition is commenced. It is advantageous to operate in a pH range of from 1.5 to 0.1. This leads to the production of particularly fine cellular foams. This adjustment of the pH to a low value makes it possible to carry out decomposition at temperatures as low as 70°C without the time required therefore being much more than 30 minutes. It is frequently advantageous to effect olefin elimination at temperatures below 170°C. The low pH is set up by adding sulfuric acid, phosphoric acid, benzene sulfonic acid, toluene sulfonic acid or compounds which yield acids.

The temperatures and heating times to be employed depend on the composition of the polymers used and on any other additives which may have been used. The most advantageous temperatures are usually in the range 70° to 170°C, preferably in the range 100° to 140°C, whilst the heating time is usually in the range of from 30 seconds to 30 minutes, preferably from 2 to 15 minutes.

In a particularly advantageous embodiment of the process there are added to the polymers containing tertiary ester groups polyfunctional compounds capable of reacting with the acid groups of the polymers liberated by decomposition thereof, for example polyfunctional alcohols, such as glycerol and glycol. This results in a reaction which makes the flat foamed material more resistant to the action of water. Such compounds may be added in amounts of from 0.5 to 60 percent, preferably from 3 to 25 percent, by weight based on the weight of polymer used.

The resistance of the foams to the action of water may also be increased by carrying out decomposition and then reacting the carboxyl groups of the polymeric foam with polyfunctional compounds, such as polyfunctional amines, isocyanates or polyfunction metal ions such as aluminum, chromium or calcium ions.

It is possible to adjust a large number of other important properties, such as resistance to the cold and abrasion, as desired by combining the said polymers containing esters of tertiary alcohols with other polymers. This is most readily achieved by adding to the aqueous systems other emulsions, solutions or aqueous dispersions and carrying out the process with the mixture thus obtained. Thus, for example, a dispersion of a copolymer of butyl acrylate may be blended with dispersions based on polyvinylidene chloride, polyvinyl chloride, polyacrylate, polymethacrylate, polyvinyl ester and polyolefins. It is however also possible to prepare these polymer mixtures by adding the other polymers in powder form to the aqueous dispersions. This is particularly advantageous if it is difficult to prepare the said other polymers in the form of dispersions, as is the case, for example, with polyolefins. In this instance, a polyethylene powder may be added to the dispersed polymers containing tertiary ester groups and homogeneously mixed therewith, whereupon the process is continued as described above for the manufacture of flat foam articles capable of absorbing water vapor.

It is of course also possible to prepare solutions of the polymers to be added and to incorporate these into an aqueous dispersion. This method is useful, for example, when it is desired to add polymers which, on the one hand, are very difficult to prepare in form of dispersions but which, on the other hand, are so soft that the manufacture of a powder entails considerable difficulties. This is the case, for example, with polyisobutylene, which is advantageously dissolved in aliphatic hydrocarbons and the solution is then incorporated into the dispersions. In general, the amount of other polymers used is advantageously such that from 0.1 to 10, preferably from 0.5 to 2, parts by weight of said other polymers are present per part of the polymer to be used in accordance with the present invention.

The total mixture should never contain less than 5 percent by weight of polymerized units of esters of tertiary alcohols in the polymers; preferably it should contain more than 10 percent by weight thereof. The actual amount depends on the desired properties of the foam to be produced.

The heat required to expand the plastics materials may be applied in a variety of ways, for example by hot gases, hot liquids, infrared radiation and high-frequency heating. As a rule, the products are processed at atmospheric pressure.

In order to produce shaped cellular articles from the copolymers, a blank may be made from the non-expanded polymer and this then expanded with or without the aid of a mold.

A process which is of interest for the production of porous shaped articles is one in which the particulate products, the particles advantageously having a diameter of from 0.1 to 2 mm, are expanded in a mold which is not gastight when closed. By such molds we mean those from which the air can escape when the mold cavity is filled by the expanding material. The amount of material to be expanded and the volume of the mold are so correlated that the expanding material exerts slight pressure on the inside walls of the mold. In this way the individual granules of plastics material fuse together during expansion and thus form articles having the desired dimensions.

The cellular articles produced by the process of the invention may be successfully used in various fields of industry. For example, they are suitable as thermal and sound insulating materials.

The invention is further illustrated by the following Examples in which parts are parts by weight.

EXAMPLE 1

94 parts of tert-butyl acrylate, 4 parts of methyl acrylate and 2 parts of vinyl sulfonic acid are polymerized at from 55° to 60°C in the presence of 3 parts of sodium paraffin sulfonate, 0.5 part of the addition product of ethylene oxide and sperm oil alcohol and 0.6 part of potassium persulfate, all dissolved in 150 parts of water. The dispersion has a pH of 1.05. The resulting emulsion polymer is dried in a through-circulation dryer at 30°C for 5 hours until it has a residual water content of 1 percent. It is then heated at a temperature of 100°C for 15 minutes and a foam having a specific gravity of 0.04 is obtained.

EXAMPLE 2

89 parts of tert-butyl acrylate, 6 parts of vinyl sulfonic acid and 5 parts of methyl acrylate are polymerized with 4 parts of the addition product of ethylene oxide and octyl phenol, 0.5 part of sodium vinyl sulfonate and 0.6 part of potassium persulfate in 150 parts of water at 59°C. The dispersion has a pH of 1.95. The polymer is dried as described in Example 1 (residual water content 0.5 percent) and heated at 80°C. After about 7 minutes it begins to expand. The foam obtained has a specific gravity of 0.020.

EXAMPLE 3

10 parts of the emulsion polymer prepared according to Example 2 (calculated as solids) is mixed with 40 parts of an emulsion polymer of 91 parts of vinylidene chloride and 9 parts of methyl acrylate, the mixture being adjusted to a pH of 1.3 and then dried under mild conditions to a residual water content of 1.5 percent. The resulting mixture is heated at 100°C and after 12 minutes a foam is obtained which has a specific gravity of 0.027.

EXAMPLE 4

100 parts of the emulsion polymer prepared according to Example 2 is mixed with 1.5 parts of an emulsion polymer of 2 parts of vinyl pyrrolidone and 1 part of vinyl propionate. The mixture is adjusted to a pH of 0.2, dried to a water content of 0.7 percent, and foaming is effected by heating at 100°C.

EXAMPLE 5

100 parts of the emulsion polymer prepared according to Example 2 is mixed with 20 parts of a 15 percent aqueous solution of polyvinyl methyl ether. The mixture is adjusted to a pH of 0.5 and then dried at less than about 50°C to a water content of 2 percent. When irradiated with infrared radiation the resulting material expands to give a foam having a specific gravity of 0.01.

EXAMPLE 6

100 parts of a copolymer of 93 parts of tert-butyl acrylate, 4 parts of n-butyl acrylate and 3 parts of methyl acrylate in aqueous dispersion are adjusted to a pH of 0.6 with an aqueous solution of phosphoric acid and polyoxyethylated fatty alcohol.

The mixture is dried to a water content of 3 percent and then heated at 120°C for 5 minutes. A foam having fine cells is produced.

EXAMPLE 7

In the manner described in Example 6 a dispersion of a copolymer of 90 parts of tert-butyl methacrylate, 4 parts of ethyl acrylate and 6 parts of acrylic acid is adjusted to a pH of 1.5. It is dried to a water content of 2 percent and heated at 130°C. A foam having fine cells is produced.

EXAMPLE 8

In the manner described in Example 6 100 parts of a 40 percent dispersion of a copolymer of 95 parts of tert-butyl acrylate and 5 parts of acrylonitrile are mixed with 10 parts of ethylene glycol and then dried. To effect foaming the mixture is heated at 140°C.

EXAMLE 9

A polymer produced and dried as described in Example 1 is comminuted to form particles having an average diameter of 2 mm. A perforated metal mold is three-quarters filled with the particles. The charged mold is heated at about 150°C by means of hot air thus causing the particles to foam up and fuse together.

EXAMPLE 10

Copolymers are prepared by emulsion copolymerization of the monomers specified in the following Table. The resulting dispersions are adjusted to a pH of 1.5 and dried to a residual water content of 2.8 percent. The polymers are heated at 120°C for 7 minutes. The foams obtained have particularly fine cells and their density (expressed as weight per liter) is given in the 3rd column of the Table.

TABLE

| Monomers | Parts | Density of foam g/l |
|---|---|---|
| tert-butyl acrylate | 93 | 30 |
| vinyl propionate | 7 | |
| tert-butyl acrylate | 90 | 50 |
| styrene | 7 | |
| acrylic acid | 3 | |
| tert-butyl acrylate | 78 | 80 |
| vinyl chloride | 20 | |
| vinyl sulfonic acid | 2 | |
| tert-butyl acrylate | 50 | 60 |
| ethyl acrylate | 50 | |
| tert-butyl acrylate | 20 | 100 |
| ethyl acrylate | 80 | |
| tert-butyl methacrylate | 50 | 80 |
| ethyl methacrylate | 50 | |
| tert-butyl acrylate | 80 | 90 |
| maleic acid tert-butyl half-ester | 20 | |

EXAMPLE 11

In a three-necked stirred flask equipped with thermometer, paddle mixer and feed vessel there are placed 700 parts of a mixture of 630 parts of ethyl acetate and 70 parts of tert-butyl acrylate and this is stirred under reflux (79° to 80°C). There are then added 1.73 parts of benzoyl peroxide (dissolved in 10 parts of tert-butyl acrylate). Starting from the commencement of polymerization (after about 30 minutes) there is added to the polymerizing mixture at a uniform rate, in the course of 5 hours, a mixture of 650 parts of ethyl acetate and 785 parts of tert-butyl acrylate at 80° to 81°C with stirring. After all has been added, 0.1 part of benzoyl peroxide (dissolved in 5 parts of tert-butyl acrylate) is added and the reaction mixture is stirred for a further 8 hours at 79° to 80°C. After cooling to 25°C there is obtained 1,950 parts of a pale yellow solution. Determination of the amount of the dissolved polymer shows that a yield of 98 percent by weight (after drying for 6 hours in vacuo at 60°C) is obtained. The k value of the solution is 36.0 (1 percent solution in ethyl acetate); the viscosity of the solution is 64 seconds as measured in a DIN beaker No. 4 at 20°C.

100 parts of the solution is homogeneously mixed in a paddle agitator with 1 part of phosphoric acid having a density of 1.7. With the agitator running 80 parts of spun glass fibers having an average thickness of 6 $\mu$ and cut to lengths of approximately 20 mm are spinkled in and at the same time 80 parts of ethyl acetate is slowly added.

The homogeneous mixture is applied to a mill of which the working roll is heated to 100°C and the pressure roll is cooled to 18°C, to form a layer having a thickness of 0.5 mm, and the resultant sheet is removed from the mill.

Four such sheets are placed on top of each other, each layer being at right angles to the layer beneath it, pressed for 15 minutes at 100°C under a pressure of 3 kg/cm² and then heated at atmospheric pressure for 30 minutes at 160°C.

There is thus obtained a flat porous structure having an average thickness of 6 mm. The water absorption of the structure is 180 g/kg after having been stored for 24 hours at 23°C and a relative humidity of 100 percent.

EXAMPLE 12

In a three-necked stirred flask equipped with thermometer, reflux condenser and paddle mixer a mixture is prepared with stirring from 80 parts of distilled water, 0.1 part of the sodium salt of a disulfonimide of a naphtha ($C_{10}H_{22}$), 0.1 part of a polyvinyl pyrrolidone having a K value of 90, 0.3 part of benzoyl peroxide and 20 parts of tert-butyl acrylate. While stirring at a speed of 200 r.p.m. the mixture is heated to 70°C and kept at this temperature for 6 hours, stirring being continued at the said speed. After cooling to about 25°C, the suspension is suction filtered and the solid residue is washed three times with distilled water and then dried in a vacuum cabinet at 50°C. There are thus obtained 19 parts of poly-(tert-butyl acrylate) in the form of a free-flowing powder.

100 parts of chrysotile having a fiber length of 1 mm is treated with 400 parts of 5 percent hydrochloric acid at 60°C for 1 hour. The fibers are then filtered off, rinsed twice, each time with 1,000 parts of cold water, and dried. These pretreated fibers are placed in an open paddle agitator together with 200 parts of the poly (tert-butyl acrylate) powder and homogeneously mixed. With the agitator running 20 parts of a 20 percent solution of α-naphthalene sulfonic acid in water is sprayed onto the mixture, stirring being continued for 15 minutes. The homogeneous mixture thus obtained is placed loosely on a tray to give a layer having a thickness of about 3 cm, and is then dried at 50°C in a through-circulation dryer until its moisture content is 1.5 percent.

This mixture is then pressed for 20 minutes at 95°C under a pressure of 5 kg/cm² to form a dense sheet having a thickness of 3 mm, which is then cooled to 25°C and removed from the press. The resulting sheet is then heated in a press, whose mold parts are 8 mm apart, at 150°C for 30 minutes.

There is thus obtained a porous structure which, after having been stored for 24 hours at 40°C and 80 percent relative humidity, is sufficiently flexible to be cut into sheets having a thickness of 1.5 mm on a leather-splitting machine.

This porous flat structure, after treatment at 23°C and 50 percent relative humidity, exhibits an additional water vapor absorption of 260 g/kg when stored at 23°C and 100 percent relative humidity for 8 hours.

What we claim is:

1. A process for the manufacture of foams by heating polymers containing polymerized units of esters of acrylic acid, methacrylic acid, and maleic acid with tert-butanol, at elevated temperatures, which comprises setting up a pH of from 2.0 to 0.1 in aqueous systems of the polymers, evaporating the water at a temperature below the decomposition temperature of said polymers and heating the residue having a residual water content of not more than 10 percent at temperatures above the decomposition temperature of the carboxylic esters to foam said polymers.

2. A process as claimed in claim 1 wherein the polymer having a residual water content of not more than 10 percent is comminuted to form non-expanded expandable particles, particles a mold cavity is partially filled with the particles and heated to expand and fuse the particles together after the water has been evaporated to form a foamed article which is subsequently removed from the mold cavity.

3. A process as claimed in claim 1 wherein said residual water content is less than 3 percent.

4. A process as claimed in claim 1 wherein polymers are used which contain from 0.1 to 10 percent by weight of polymerized units of a copolymerizable acid, based on the monomers, said copolymerizable acid being selected from the group consisting of acrylic acid, methacrylic acid, maleic acid, vinyl sulfonic acid, styrene sulfonic acid, 3-methacryloxy-propylsulfonic acid, 3-methacryloxy-ethyl-sulfonic acid, 3-acryloxy-propylsulfonic acid, 3-acryloxy-ethyl-sulfonic acid and vinyl phosphonic acid.

5. A process as claimed in claim 4 wherein said copolymerizable acid is acrylic acid.

6. A process as claimed in claim 4 wherein polymers are used which contain polymerized units of copolymerizable acids having a dissociation constant of more than $10^{-4}$.

7. A process as claimed in claim 6 wherein said acid is vinyl sulfonic.

* * * * *